(12) United States Patent
Rickert et al.

(10) Patent No.: US 7,905,078 B2
(45) Date of Patent: Mar. 15, 2011

(54) MACHINE FOR THE HARVEST OF STALK-LIKE PLANTS

(75) Inventors: Clemens Rickert, Ahaus (DE); Jens Grobmeier, Stadtlohn (DE); Martin Hüning, Billerbeck (DE); Leo Schulze Hockenbeck, Everswinkel (DE); Clemens Weitenberg, Borken (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/257,685

(22) Filed: Oct. 24, 2008

(65) Prior Publication Data

US 2009/0158700 A1    Jun. 25, 2009

(30) Foreign Application Priority Data

Dec. 22, 2007    (DE) .......................... 10 2007 062 455

(51) Int. Cl.
    *A01D 45/02*    (2006.01)
(52) U.S. Cl. ..................................... 56/53; 56/51; 56/60
(58) Field of Classification Search .............. 56/51, 157, 56/255, 295, DIG. 17, DIG. 20, 6, 617.5, 56/192, 17.5, 53, 60, 193
    See application file for complete search history.

(56) References Cited

U.S. PATENT DOCUMENTS

| 2,949,716 | A | * | 8/1960 | Thomson | 56/14.3 |
|---|---|---|---|---|---|
| 2,968,903 | A | * | 1/1961 | Kesling | 56/10.1 |
| 4,270,337 | A | * | 6/1981 | Pinto | 56/13.9 |
| 5,722,225 | A | * | 3/1998 | Wuebbels et al. | 56/60 |
| 6,959,529 | B2 | * | 11/2005 | Wubbels | 56/60 |

FOREIGN PATENT DOCUMENTS

| EP | 0448844 A | 10/1991 |
|---|---|---|
| EP | 0502653 A | 9/1992 |
| EP | 0504639 A | 9/1992 |
| EP | 0673594 A | 9/1995 |
| NL | 6810919 A | 2/1969 |

OTHER PUBLICATIONS

European Search Report dated Apr. 21, 2009, (6 pages).

* cited by examiner

*Primary Examiner* — Alicia M Torres
(74) *Attorney, Agent, or Firm* — Taylor IP

(57) ABSTRACT

A machine for the harvest of stalk-like plants with a cutting arrangement for cutting plant stalks that extends in a plane terminating in a cutting edge and a conveying arrangement for taking up and conveying away the cut plant stalks. The plane of the cutting arrangement is inclined upward in the forward operating direction (V) of the machine.

6 Claims, 2 Drawing Sheets

MACHINE FOR THE HARVEST OF STALK-LIKE PLANTS

FIELD OF THE INVENTION

The present invention relates to a machine for the harvest of stalk-like plants having a cutting arrangement for cutting plant stalks that extends in a plane ending in a cutting edge, and a conveying arrangement arranged above the cutting arrangement to take up and convey away the cut plant stalks.

DESCRIPTION OF THE RELATED ART

DE 195 31 918 A describes a machine appropriate for the harvest of stalk-like plants, such as corn, for attachment to a forage harvester. The machine is provided with several intake and mowing arrangements arranged transverse to the forward operating direction in which the machine is moved across a field during the harvesting operation. The intake and mowing arrangements include a lower cutting disk in the form of a circular saw blade and conveying disks arranged above these with recesses for taking up plants. The cutting disks are brought into rotation at a higher speed than the conveying disks. The plants remaining on the field that are separated from the stubble by the cutting disks are taken up by the conveying disks and transported to the center of the machine along the rear sides of the intake and mowing arrangements by the conveying disks and the transverse conveying drums arranged in the gusset area between conveying drums, and delivered to an intake channel of a forage harvester.

The cutting disks and the conveying disks of the individual intake and mowing arrangements are flat in themselves and arranged coaxially to each other. During the harvesting operation the machine is brought into such an angular position by means of the actuator that pivots the machine about the axis of the chopper drum, connecting the intake channel of the forage harvester with the machine that is attached to it, so that the axes of rotation of the cutting disks and the conveying disks are inclined slightly in the forward direction relative to the vertical. The usual angle is about 10°. Therefore, the cutting disk is located in a plane inclined forward and downward. Accordingly, during the cutting the upper parts of the plant stalks are raised slightly when the cutting disks separate the plant from the stubble remaining in the ground since they slide along the upper side of the cutting disk. Simultaneously, the cut stalk of the plant is accelerated and carried along by the rotation of the cutting disk in the circumferential direction or in the tangential direction. This movement of the stalk in the circumferential direction, however, makes the entry of the plant stalk into the bottom of the recess in the conveying disk more difficult which on occasion leads to faulty acceptance of the plants in the conveying disks and plant losses.

What is needed in the art is a machine for the harvest of stalk-like plants with a cutting arrangement and a conveying arrangement arranged above it for taking up and conveying away plant stalks, in which the acceptance of plants by the conveying arrangement is improved.

SUMMARY OF THE INVENTION

The present invention provides a machine that can be moved across a field in the forward operating direction for the harvest of stalk-like plants, including a cutting arrangement for cutting off plants from the stubble remaining in the ground and a conveying arrangement arranged above the cutting arrangement for taking up and conveying away the cut plant stalks. In the position assumed during the normal harvesting operation, the cutting arrangement extends, at least in its forward area that interacts with the plants, in a plane that is inclined upward in the forward direction and that may be at an angle or in steps. This plane terminates at a cutting edge that is used to cut off the plants. Hence, the plants are cut by means of the cutting edge which follows the plane that is inclined downward, as seen from the standpoint of the plant.

In this way the plant stalk can sink downward slightly after the cutting process and has sufficient time to sink more deeply into the conveying pockets or the recesses of the conveying arrangement. The result is an improved taking up and guidance of the plants since their lower ends are located in a recess defined by the inclined plane of the cutting edge.

In one embodiment of the present invention, the cutting arrangement can be rotated about an axis. It is also conceivable that the cutting arrangement could be attached rigidly to the machine or could be arranged in the form of a chain conveyor so as to circulate about two or more axes. The aforementioned axis or axes may be inclined towards the rear opposite to the forward operating direction. Then, the cutting arrangement can extend in a plane radial to the axis or to the axes which permits a simple configuration, however, at a cost of potential space issues. Alternatively, the aforementioned axis or axes may be inclined in the forward direction. Then appropriate measures must be taken in order to attain the inclination of the plane of the cutting arrangement according to the present invention.

For the attachment of a cutting knife of the cutting arrangement, so that it can rotate about an axis inclined in the forward direction, a central retainer ring can be used that is connected in its interior with a shaft that can be driven in rotation and that carries a single knife on its outside or several cutting knives that follow each other in the circumferential direction. Due to the direction of the axis, inclined toward the front as against the vertical, and the areas of the cutting arrangement interacting with the plants that are inclined upward towards the front, according to the present invention, a conical shape of the cutting knives has been found to be useful.

The conveying arrangement may include several conveying disks arranged one above the other with recesses or conveying pockets distributed around their circumference that can be brought into rotation by means of a drive about an axis coaxial to the axis of the cutting arrangement. In another embodiment of the present invention, several conveying chains with drivers extending outward arranged one above the other are used as conveying arrangements, the chains circulate about two or more axes.

BRIEF DESCRIPTION OF THE DRAWINGS

The above-mentioned and other features and advantages of this invention will be better understood by reference to the following description of an embodiment of the invention taken in conjunction with the accompanying drawings, wherein.

Corresponding reference characters indicate corresponding parts throughout the views. The exemplification set out herein illustrates an embodiment of the invention and is not to be construed as limiting in scope of the invention in any manner.

DETAILED DESCRIPTION OF THE INVENTION

Figure 1:
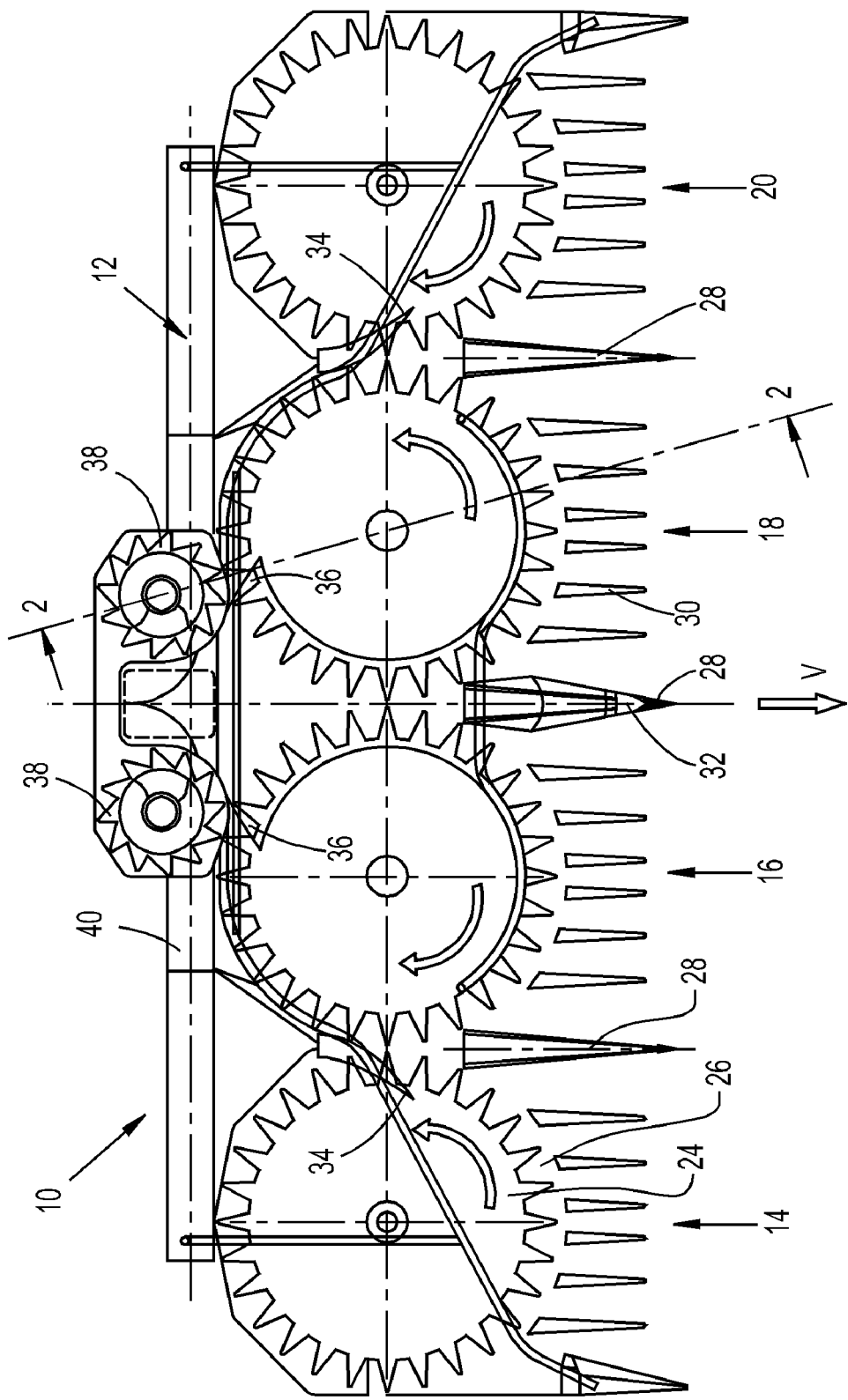
FIG. 1 shows a plan view of a machine for the harvest of stalk-like plants.

Four mowing and intake arrangements 14, 16, 18 and 20 are fastened side-by-side alongside each other to support frame 12 of machine 10 for the harvest of stalk-like plants shown in FIG. 1 in a plan view. Each of mowing and intake arrangements 14 through 20 is composed of lower cutting arrangement 22 in the form of cutting disk 22 (see FIG. 2) that can be brought into rotation and several conveying disks 24 arranged coaxially above these that can be brought into rotation and used as a conveying arrangement. Cutting disks 22 are equipped at their edges with cutting edge 60 that is provided with sharp teeth or is sharpened in other ways, in order to separate the plant stalks from the stubble remaining in the ground. The plant stalks are accommodated in recesses 26 of conveying disks 24 and are transported to a forage harvester (not shown) that carries machine 10 and drives its movable elements and moves machine 10 in the forward direction V across a field.

Stalk separators 28 are located between each of mowing and intake arrangements 14 through 20 in order to deflect the plants to the side and to bring the plants into the intake area of intake and mowing arrangements 14 through 20, if necessary. Smaller stalk separators 30 in the form of separating points 30 are arranged on the front sides of intake and mowing arrangements 14 through 20. The operating width of intake and mowing arrangements 14 through 20 in each case corresponds to 2 rows, that is, approximately 1.5 m. Hence, machine 10 can simultaneously harvest 8 rows of grain sowed with a spacing of 75 cm. By the use of other dimensioning and/or other numbers of intake and mowing arrangements 14 through 20, any other desired operating width can also be attained.

During the harvesting operation intake and mowing arrangements 14 through 20 rotate in the directions indicated by the arrows. Therefore, inner intake and mowing arrangements 16 and 18, located adjacent to longitudinal center plane 32, convey the plants at first to the outside and then to the rear, while outer intake and mowing arrangements 14 and 20 rotate in the opposite direction to adjacent mowing and intake arraignments 16 and 18. As can be seen on the basis of FIG. 1, outer intake and mowing arrangements 14 and 20 deliver their charge of the harvested crop approximately in the center between the axes of rotation of intake and mowing arrangements 14 and 16 or 18 and 20 to inner intake and mowing arrangements 18 and 20, for which purpose cleaning devices 34 are provided. The harvested crop is lifted out of recesses 26 by further cleaning devices 36 on the rear side of inner intake and mowing arrangements 16 and 18 and delivered to conveying drums 38 which rotate about axes inclined slightly in the forward direction and overcome the difference in height between the bottom of machine 10 and the following intake rolls of the intake channel of the forage harvester.

Figure 2:
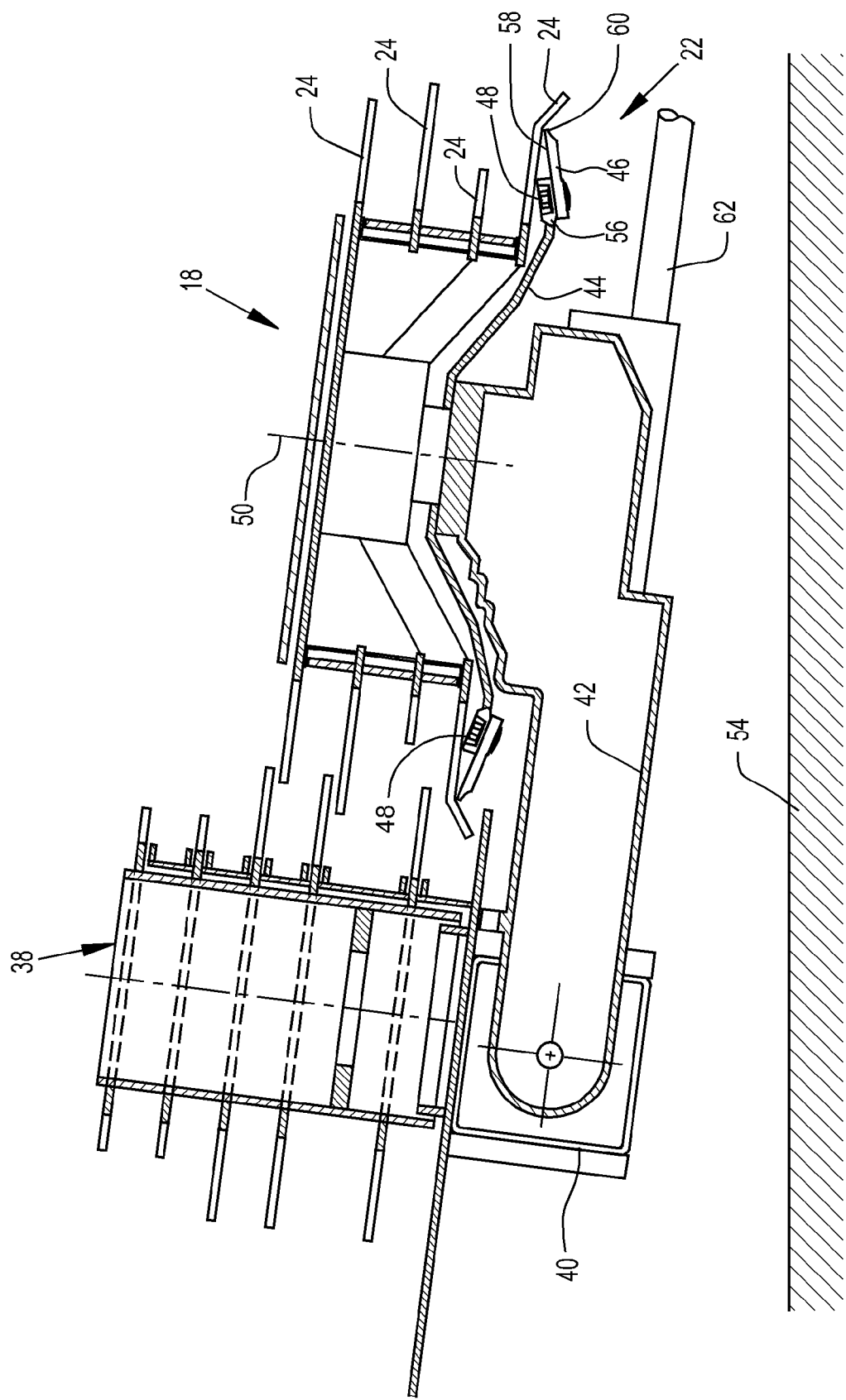
FIG. 2 shows a cross section through the machine along the line 2-2.

FIG. 2 shows a cross section through machine 10 along line 2-2 of FIG. 1. Hollow transverse carrier 40 of support frame 12 carries gearbox housings 42 on each of which intake and mowing arrangement 18 is supported and from which attachment tubes 62 extend to the front for separating points 30. In gearbox housing 42, drive devices are provided for the drive of conveyor disks 24 and cutting arrangement 22, the latter rotates in the same direction or the opposite direction to conveying disks 24 (preferably at a higher rotational speed than conveyor disks 24). Cutting arrangement 22 is composed of one or more cutting knives 46 that follow each other in the circumferential direction of cutting arrangement 22 and are fastened so that they can be removed to flange 56, arranged at the outer circumference of retainer ring 44 by screws 48 or other appropriate means. Retainer ring 44 is connected at its center with the drive devices in gearbox housing 42.

Axis of rotation 50 of cutting arrangement 22 and conveyor disk 24, shown in FIG. 2, is in the position that machine 10 assumes during the normal harvesting operation, that is, it is inclined approximately 10° from the vertical in the forward direction V, so that the plane in which conveying disks 24 and cutting disks 22 rotate is also inclined approximately 10° downward relative to ground 54. Retainer ring 44 forms flange 56 at its outer circumference. The surface of this flange adjoins cutting knives 46, oriented radially to axis of rotation 50 or, as shown in FIG. 2, extends at a small angle upward to the radius of axis of rotation 50. Cutting knives 46 extend in a plane 58 that terminates in outer cutting edge 60 which extends around the circumference of cutting arrangement 22. Cutting knives 56 are formed in the shape of a cone so that plane 58 extends outward and upward starting from flange 56. Here, the result is that plane 58 of the forward region of mowing and intake arrangement 18, as seen in the forward direction V, is inclined at an angle of approximately 5° in the forward and upward direction relative to ground 54. The rear half of cutting knives 46 is located in a plane that is inclined even more (by about 15°) upward.

Accordingly, during the harvesting operation the plants are separated from the stubble remaining in the ground by cutting edge 60. On the basis of the inclination of plane 58 towards the front and upward, according to the present invention, (or as seen from the standpoint of the plants, to the rear and downward) the plant can sink downward on plane 58 after being cut off, thereby penetrating better into the base of recess 26. In this way the plants are taken up much more readily.

Having described the preferred embodiment, it will become apparent that various modifications can be made without departing from the scope of the invention as defined in the accompanying claims.

What is claimed is:

1. A machine for the harvest of plants having stalks, comprising:
    a cutting arrangement for the cutting of plant stalks, said cutting arrangement being rotatable about an axis and extending in a plane inclined upward relative to a radius of said axis, said plane terminating at a cutting edge, said plane having an inclination in an upward direction relative to the ground in a direction toward said cutting edge throughout the rotation of said cutting arrangement about said axis; and
    a conveying arrangement being arranged above said cutting arrangement, said conveying arrangement being configured for taking up and conveying away cut plant stalks.

2. The machine according to claim 1, wherein said axis is inclined in a forward direction relative to vertical.

3. The machine according to claim 2, wherein said cutting arrangement includes a drive, a central retainer ring rotatable by said drive about said axis, and at least one conical cutting knife having said cutting edge, said at least one conical cutting knife being connectable to and removable from said retainer ring.

4. The machine according to claim 1, wherein said conveyor arrangement includes a drive and a plurality of conveyor disks having recesses distributed about a circumference of each said conveyor disk, said plurality of conveyor disks being arranged one above the other and rotatable by said drive about an axis coaxial to said axis of said cutting arrangement.

5. The machine according to claim 1, wherein said inclination is approximately five degrees in a forward direction.

6. The machine according to claim 1, wherein said inclination is at least approximately five degrees.

* * * * *